J. F. STEWARD.
SUPPORT FOR HARVESTING MACHINE REELS.
APPLICATION FILED APR. 10, 1911.
1,045,210.
Patented Nov. 26, 1912.
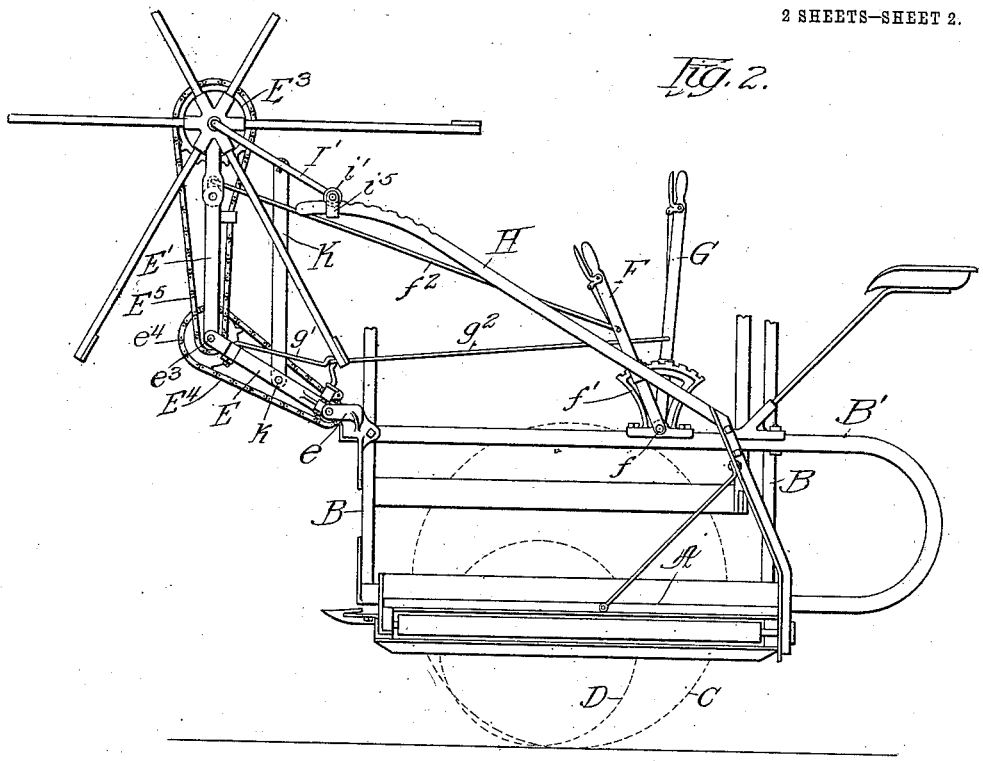
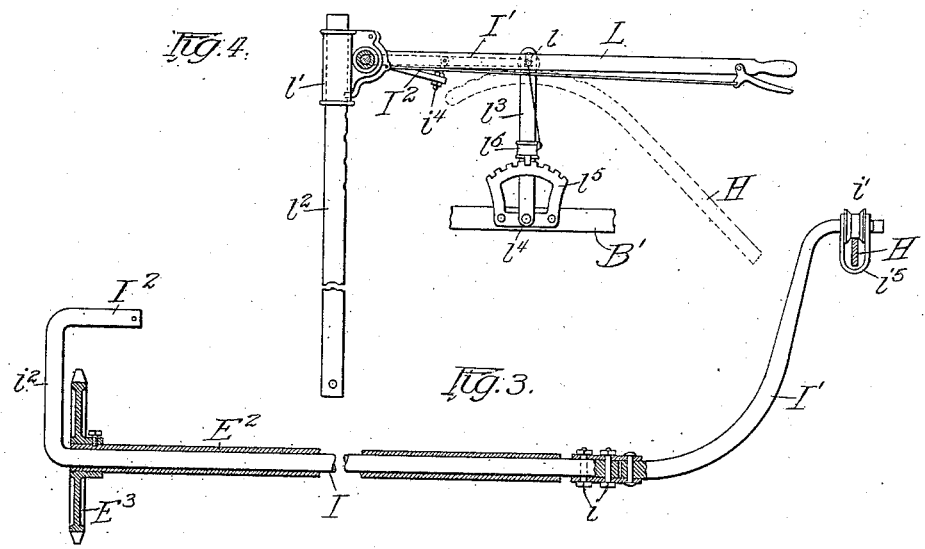
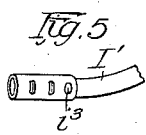

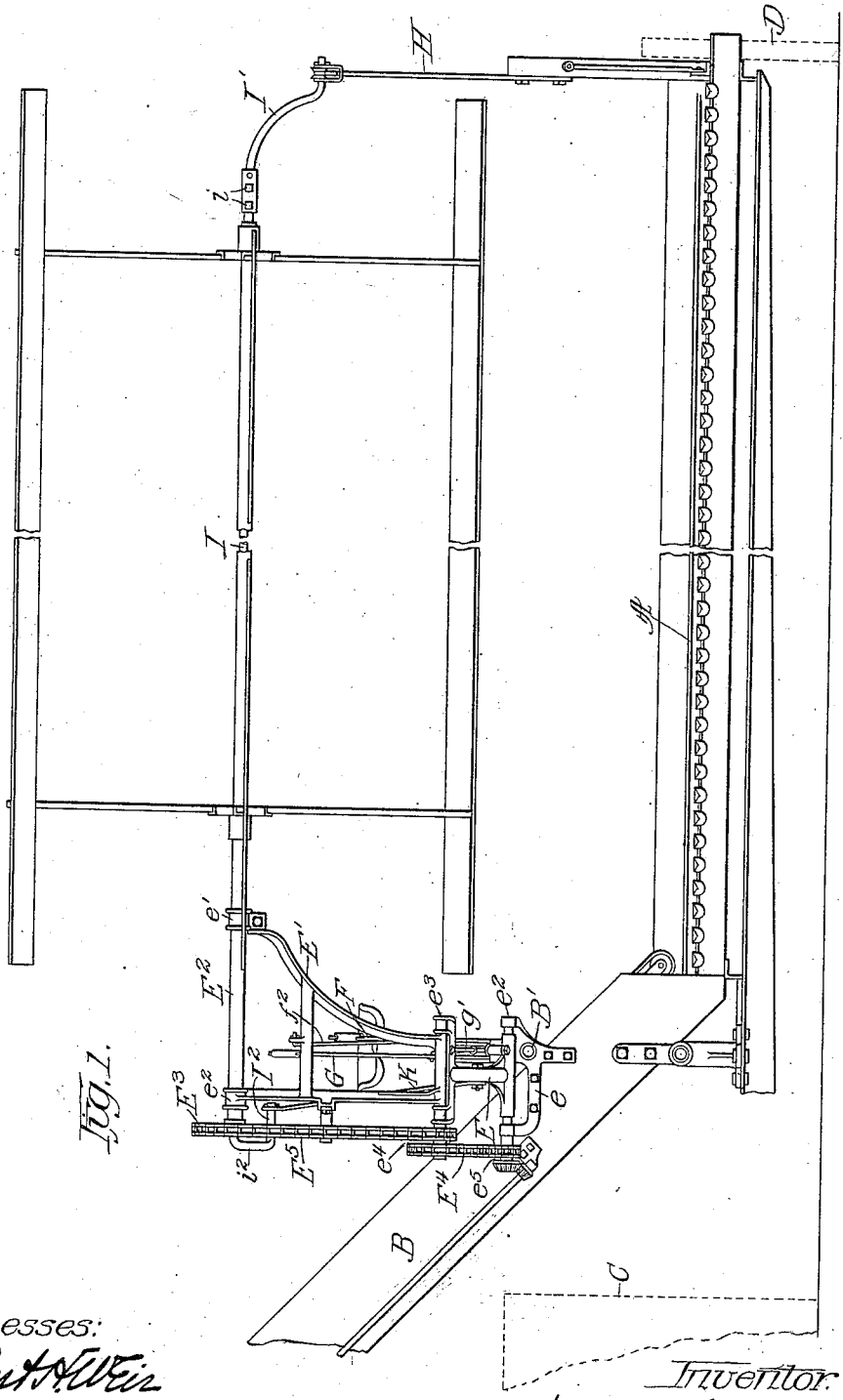

UNITED STATES PATENT OFFICE.

JOHN F. STEWARD, OF CHICAGO, ILLINOIS.

SUPPORT FOR HARVESTING-MACHINE REELS.

1,045,210.   Specification of Letters Patent.   Patented Nov. 26, 1912.

Application filed April 10, 1911. Serial No. 620,007.

*To all whom it may concern:*

Be it known that I, JOHN F. STEWARD, a citizen of the United States, residing at Chicago, in the county of Cook and State of Illinois, have invented certain new and useful Improvements in Supports for Harvesting-Machine Reels, of which the following is a specification, reference being had to the accompanying drawings.

The object of my invention is to provide a support for the grain-end of reels, or an added support sufficiently efficient to keep steady the grain-end of reels that, in most cases, are provided with a practically efficient support at the stubble end in machines not of wide cut.

The generic idea upon which my construction is founded but designed to make less obstructive and more efficient than heretofore, may be considered, in part, to be as shown in the patent granted to E. A. Johnston, No. 829,016, dated August 21, 1906, and the improvement consists in modifications and additions whereby the outer or grain-side support is far above the divider and cutting apparatus so that when the reel is raised high, as in cutting high grain, the support shall not interfere with the proper reeling of long grain, which the vertical adjustment of the reel provides for.

In the drawings—Figure 1 is a front view of such parts of a harvesting machine as necessary to illustrate my invention, in this instance the added reel support being adapted to one of the more complicated forms of harvester reel; Fig. 2 is a grainside elevation; Fig. 3 is a bar extending from the grainside to the stubbleside of the machine upon which the tubular reel shaft revolves; Fig. 4 is a modified form of embodiment of the invention in so far as applicable to a simpler form of reel, as, for instance, that of Johnston, above referred to, and similar forms; and Fig. 5 is a detail of the supporting bar.

A represents the platform and cutting apparatus of an ordinary harvesting machine, B a part of the main frame, C the main supporting wheel, and D the grain wheel, $B^1$ being the portion of the frame on which the reel adjusting and controlling devices are supported.

E is an arm pivotally supported at its lower end by the bracket $e$, the latter being secured to the harvester frame in any suitable manner. Extending upwardly from the arm E, and pivoted to the upper and forward end thereof, is a bracket $E^1$, that may be considered as a second arm. This bracket forms a support for the reel shaft $E^2$, the latter being journaled in the bearings $e^1$ and $e^2$. Upon the reel shaft is the usual sprocket wheel $E^3$, or gear, as may be desired. The bracket $E^1$ is pivoted to the arm E by means of the pin $e^3$, sustained in suitable bearings on the arm E. On this pin, for convenience, is placed a double sprocket wheel $e^4$, and upon the pin $e^2$ also sprocket wheel and bevel gear as one piece therewith $e^5$. By means of the chains $E^4$ and $E^5$ the reel may be given rotation, or any of the many forms of gearing may be adapted to perform the same functions.

F is a lever preferably pivoted at $f$, directly to the quadrant $f^1$, to which it may be locked by the usual thumb latch device in various positions of adjustment. From this lever, extending forwardly and pivotally connected to the arm of bracket $E^1$, is the rod $f^2$. By means of this lever the bracket may be moved rearwardly or forwardly at will, carrying with it the reel to various positions of fore and aft adjustment. G is a similar lever pivoted to a similar quadrant, the previously mentioned quadrant $f^1$. That is, each lever F and G has a quadrant of its own placed side by side so that the axes of the levers are coincident. It is thought not necessary to show the quadrants for each lever, as they are exact duplicates, each lever working into its own quadrant. While the drawings show but a single quadrant, that may be considered as, in fact, a double one, or of any of the forms on well-known reels, particularly those of this type shown, for instance, in patent to James Macphail No. 451,943, dated May 12, 1891.

$g^1$ represents a bent rod secured to the arm E forming, in effect, a short arm projecting upward therefrom, to which the rod $g^2$, reaching to the lever G, is connected. By means of the lever G the outward or forward end of the arm E can thus be raised or lowered.

As the reel so far described is of a very common type, and its details form no part of my invention, it is thought that sufficient description has already been given.

Extending upward to a high position from the grain end of the machine platform A, and forwardly to a point above the cutting apparatus, is the arm H adapted to sustain the outer or grain-end of the reel supporting bar I. This bar extends through the tubular reel shaft $E^2$, shown in section in Fig. 3. The bar as a whole being of the form shown in Fig. 3, must be made in two parts in order that it may be passed through the tubular shaft, hence the curved portion is socketed and secured by the bolts $i$ or in any suitable way to the straight portion. Thus constructed the bar I may be passed through the reel shaft and the portion $I^1$ secured thereto. Upon the outer end of the portion $I^1$ is preferably placed an anti-friction roller $i^1$, which travels along the curved portion of the arm H, and as means for sufficiently locking the arm in any fore and aft position to which it may be moved, as required, depressions are provided to receive the roller. This may be considered a locking device, but as it is not necessary that an absolute lock should be provided, the notches serve a sufficient purpose. In some instances, however, the notches, either partially or wholly, may be dispensed with, but some means of sufficient securement is preferred. The bar I, passing stubbleward through the reel shaft, is bent backwardly, in this instance, and for convenience a part $I^2$ is so bent as to be parallel with the main portion. This is merely for the convenience of securing thereto the bar K, which, in turn, is pivoted at its lower end to the arm E at $k$. It will now be observed that the forwardly extending portion of arm E from the pivot $k$ to its outer end at the pivot $e^3$, the upwardly extending arm of bracket $E^1$, the bar K and the part $i^2$ of the bar I, form in fact a parallelogram, as seen in Fig. 2. The effective length of the grainward portion of the supporting bar $I^1$ is substantially the same radial length as the arm E. The result of this arrangement, which forms, in all positions of adjustment, a parallelogram, is that the outer end of the arm $I^1$ always travels back and forth on the arm H in the same path whatever the height of the reel may be. It will readily be seen by reference to Fig. 2 that if the lever G be moved forward or backward the arm of bracket $E^1$ will be moved upward or downward both at the upper and lower extremities on arcs of circles controlled by the arms E and $I^1$, and if the lever F be moved in either direction the upper end of the bracket or arm $E^1$ will be moved backward or forward and, because of the control due to the parallelogram, the roller on the arm I will traverse the curvature of the higher portion of the arm H, said curvature being struck as if from the pivot $e$; in other words, extended grainward. The arm $I^1$ is substantially the same length as the arm E. A moment's reflection, upon referring to Fig. 2, will show that the path of movement of the outer end of the arm $I^1$ will correspond to a curvature struck from the pivot $e$. The fact that the parts will always form a parallelogram, however adjusted, is proof of the further fact that the distance between the outer end of the arm $I^1$ and an equivalent imaginary position at the grain end of the machine strictly horizontally coincident with the pivot $e^1$, will remain the same.

In the modification (Fig. 4) another type of reel is shown, but the same broad principle finds embodiment, although the minor details of the preferred form of reel are not required. In this instance a single lever L is provided, the portion $l$ serving as means for raising and lowering the reel, the latter being journaled in a bracket $l^1$ on the standard $l^2$. This standard is provided with the usual series of notches or holes and a pawl placed upon the bracket $l^1$ of a usual form may be used for sustaining the bracket. $l^3$ is an oscillating standard, of a well-known form, pivoted at $l^4$ to the portion of the frame $B^1$, on which is also secured the quadrant $l^5$. The upper end of the standard $l^3$ may be slotted and the pin that forms the fulcrum of the lever L pass therethrough. From the said pin down to the latch $l^6$ may pass a rod and thus, by slightly lifting the lever, the latch may be disengaged from the quadrant. The simpler form of reel support shown in Fig. 4 is one in common use and in itself forms no part of my present invention, but I have shown in section and in dotted lines my present improvement as fitted to that form of reel, and claim the improvement as embodied therein. The main feature of the modification consists in the details of controlling the bar I having the arm $I^1$, it does not differ from the form shown in Figs. 1, 2 and 3 except that the stubble end $I^2$ is connected to the lever L by means of a screw bolt $i^*$ and nuts so that it can be adjusted in order to produce more or less pressure of the arm $I^1$ upon the sustaining bar H. This is for the purpose of creating sufficient pressure to hold the end of the arm sufficiently steadily into the notches of the bar H. The same is accomplished when the support is applied to the form of reel shown in Figs. 1 and 2 by having the holes in the socket for the bar or arm $I^1$ slotted, as shown in Fig. 5, the socket being secured by suitable rivets to the portion $I^1$. By loosening the bolts $i$ the arm $I^1$ and socket may be adjusted slightly. I provide no positive latch at the grain-end of the support, as I find none necessary if sufficient weight of the reel be there supported, but I treat the arrangement as a locking device; it being simpler than to provide special means which may in any other manner be controlled by the operator when moving the reel, I prefer it. The forward curved end of the bar H may be considered as a retaining quadrant as well as a support. In order that the grain-end of the arm I¹ may be prevented from becoming displaced relative to the support H, I provide the stirrup $i^5$, which may hang from the side of the roller, if roller be used, passing under the support H.

It may be found desirable to provide means for retaining the outer end of the reel support I¹ in any fore and aft position to which it may be adjusted, but I have found it better to have no positive means, and hence provide merely the notches in the upper surface of the support H, the downward pressure of the arm I¹ being sufficient to maintain the position of the support $i^1$ unless great stress is opposed to the action of the reel, in which case it is found wise to permit the arm to move and thus avoid breaking of arms and fans and the reel. The roller $i^1$ in this case is preferred to form the immediate support for the end of the arm I¹ and travel along on the arm H.

What I claim as my invention, and desire to secure by Letters Patent, is:

1. In a harvesting machine, in combination, an adjustable reel-sustaining device located at and over the stubble end of the grain-receiving platform, a support at and over the grain-end of the grain-receiving platform, a bar extending from said adjustable reel-sustaining device located at and over the stubble end of the grain-receiving platform to the said support at and over the grain-end of the grain-receiving platform, and the reel supported by and slidable thereon adapted to rotate on the said bar.

2. In a harvesting machine, in combination, an adjustable reel-sustaining device located at and over the stubble end of the grain-receiving platform, a support at and over the grain-end of the grain-receiving platform, a bar extending from said adjustable reel-sustaining support located at and over the stubble end of the grain-receiving platform to the said support at and over the grain-end of the grain-receiving platform and slidable thereon, means for maintaining the grain-end of said bar upon the said quadrant, the reel supported by and adapted to rotate on the said bar.

3. In a harvesting machine, in combination, an adjustable reel-sustaining device located at and over the stubble end of the grain-receiving platform, a support at and over the grain-end of the grain-receiving platform provided with one element of retaining means, a bar extending from said adjustable reel-sustaining device located at and over the stubble end of the grain-receiving platform to the said support at the grain-end of the grain-receiving platform and adapted, as another element, to engage with said first-mentioned element of said retaining means, and a reel supported by and adapted to rotate on the said bar.

4. In a harvesting machine, in combination, an adjustable reel-sustaining device located at and over the stubble end of the grain-receiving platform and adapted to move the reel in a forward and rearward direction, a forwardly reaching support at the outer end of the grain-receiving platform, a bar extending from said adjustable reel sustaining-device located at and over the stubble end of the grain-receiving platform to the support at the grain-end of the grain-receiving platform and adapted to move fore and aft therealong, the reel supported by and adapted to rotate on the said bar.

5. In a harvesting machine, in combination, an adjustable reel-sustaining device located at and over the stubble end of the grain-receiving platform and adapted to move the reel in a forward and rearward direction, a support at and over the grain end of the grain-receiving platform, a bar extending grainward from said adjustable reel-sustaining device, the grain end of said bar sustained by and restrained in position by said support at the grain end of the receiving platform and slidable thereon, and the said reel adapted to rotate on said bar.

6. In a harvesting machine, in combination, an adjustable reel-sustaining device located at and over the stubble end of the grain-receiving platform and adapted to permit the reel sustained thereon to be raised and lowered, a support at and over the grain-end of the grain-receiving platform, a bar extending from the said adjustable reel-sustaining device located at and over the stubble end of the grain-receiving platform to the said support at the grain-end of the grain-receiving platform, an arm on said bar extending rearwardly and adapted to rest upon the said support, and means for controlling said arm to cause it to rest with desired pressure upon the said last support and thus sustain the grain-end of the reel, the reel adapted to rotate on said bar.

7. In a harvesting machine, in combination, an adjustable reel-sustaining device located at and over the stubble end of the grain-receiving platform and adapted to permit the reel sustained thereon to be raised and lowered, a support at and over the grain-end of the grain-receiving platform, a bar extending from the said adjustable reel-sustaining device located at and over the stubble end of the grain-receiving platform to the said support at the grain-end of the grain-receiving platform, an arm on said bar extending rearwardly and adapted to rest upon the said last mentioned support, means for sustaining said arm in definite positions of adjustment, and a reel supported by and adapted to rotate on said bar.

8. In a harvesting machine, in combination, an adjustable reel-sustaining device located at and over the stubble end of the grain-receiving platform and adapted to permit the reel sustained thereon to be raised and lowered, a support at and over the grain-end of the grain-receiving platform, a bar extending from the said adjustable reel-sustaining device located at and over the stubble end of the grain-receiving platform to the said quadrant at the grain-end of the grain-receiving platform, an arm on said bar extending rearwardly and adapted to rest upon the last mentioned support, and means for adjusting the pressure of the said arm thereon thus sustaining the grain-end of the reel to a greater or less extent, the reel supported by and adapted to rotate on said bar, substantially as described.

9. In a harvester-reel, in combination, a tubular reel shaft, a reel supporting bracket carrying bearings in which said tubular shaft is journaled, means for supporting said bracket whereby it may be adjusted to a higher or lower position or in a fore and aft position, a hand lever connected with said bracket, the position of the pivot upon the bracket being coincident with the axis of said tubular reel shaft, a bar extending through said tubular reel shaft and said tubular reel shaft rotating thereon, a rearwardly extending arm upon the stubble end of said supporting bar adjacent said hand lever and adjustably connected thereto, the grain end of said supporting bar having also a rearward extension and a support upon which the grain end of said last mentioned arm may move fore and aft.

10. In a harvester-reel, in combination, a tubular reel shaft, a supporting bracket having bearings in which said tubular reel shaft is journaled, means for supporting said bracket whereby it may be adjusted to a higher or lower plane and in a fore and aft direction, a reel shaft supporting bar, its stubble end supported in said bracket, said tubular reel shaft rotating thereon and extending through said bracket, the stubbleward end of said tubular reel shaft supporting bar also extending through said bracket, the grainward end of said bar turned rearwardly, a curved support secured to the stubbleward end of the grain end of said reel shaft supporting bar and movably sustained thereon, a series of depressions formed in said last support, and means for varying the resistance to the fore and aft movement of the stubbleward arm of the tubular reel shaft supporting bar.

11. In a harvester-reel, in combination, a tubular reel shaft, a reel supporting bracket having bearings in which said tubular reel shaft is journaled, means for supporting said brackets whereby it may be retained in a higher or lower position or in a fore and aft position, a reel supporting bar, said tubular reel shaft rotating thereon, the stubbleward end of said reel supporting bar supported in said bracket and the grainward end thereof extending through said tubular shaft and forming a rearwardly extending arm, a U-shaped retainer pivotally connected to the rear of said arm, a flanged wheel journaled upon said arm, a curved support at the grain end of the harvester frame adapted to sustain said wheel and permit it to roll thereon, and a series of depressions in said curved support.

12. A harvester reel supporting mechanism including, in combination, a tubular reel shaft, a supporting bracket for said shaft journaled thereon, and means for supporting said bracket in a manner whereby it may be adjusted to a higher or lower plane or in a fore and aft direction, a reel supporting shaft received by said tubular shaft in a manner permitting said tubular shaft to rotate thereon, an arm secured to the stubbleward end of said reel supporting shaft, the opposite end of said shaft being provided with a rearwardly extending crank portion, a support for said crank portion permitting it to be adjusted in a fore and aft direction, and means whereby said arm may be adjusted relative to said supporting bracket in a manner to rock said reel supporting shaft whereby the grainward end thereof may be adjusted to a higher or lower plane independent of the stubbleward end thereof.

13. A harvester reel supporting mechanism including, in combination, a tubular reel shaft, a reel supporting bracket carrying bearings in which said tubular shaft is journaled, means for supporting said bracket in a manner whereby it may be adjusted to a higher or lower plane or in a fore and aft direction, said means including a hand lever connected with said bracket coaxially with said tubular shaft, a reel supporting shaft received by said tubular shaft in a manner permitting said tubular shaft to rotate thereon, an arm secured to the stubbleward end of said reel supporting shaft adjacent said hand lever, the opposite end of said shaft being turned rearward and grainward beyond the end of said tubular shaft, a support at the grainward end of the reel arranged in a fore and aft direction and upon which said reel supporting shaft is slidably mounted, said arm being secured to said hand lever in an adjustable manner whereby said reel supporting shaft may be rocked in a manner to raise or lower the grainward end of the reel independent of the stubbleward end thereof.

JOHN F. STEWARD.

Witnesses:
G. A. RAMSEY,
F. W. HOFFMAEISTER.

Copies of this patent may be obtained for five cents each, by addressing the "Commissioner of Patents, Washington, D. C."